US011695851B2

(12) United States Patent
Bielby

(10) Patent No.: US 11,695,851 B2
(45) Date of Patent: Jul. 4, 2023

(54) GATEWAY FOR VEHICLE WITH CACHING BUFFER FOR DISTRIBUTED STORAGE SYSTEM

(71) Applicant: Micron Technology, Inc., Boise, ID (US)

(72) Inventor: Robert Richard Noel Bielby, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/892,092

(22) Filed: Jun. 3, 2020

(65) Prior Publication Data

US 2021/0385294 A1    Dec. 9, 2021

(51) Int. Cl.
*H04L 67/568*    (2022.01)
*H04L 12/66*    (2006.01)
*H04L 67/1097*    (2022.01)
*H04L 9/40*    (2022.01)

(52) U.S. Cl.
CPC .......... *H04L 67/568* (2022.05); *H04L 12/66* (2013.01); *H04L 63/168* (2013.01); *H04L 67/1097* (2013.01)

(58) Field of Classification Search
CPC . H04L 2012/40215; H04L 2012/40273; H04L 67/12; H04L 12/40; H04L 12/46; H04L 12/66
See application file for complete search history.

(56) References Cited

U.S. PATENT DOCUMENTS

| 10,616,734 | B1 * | 4/2020 | Lekutai | H04W 4/027 |
| 10,852,746 | B2 * | 12/2020 | Silver | B60W 30/18172 |
| 2004/0138809 | A1 * | 7/2004 | Mukaiyama | G08G 1/096716 |
| | | | | 701/2 |
| 2006/0221987 | A1 * | 10/2006 | Polson | H04W 88/16 |
| | | | | 370/402 |
| 2006/0271694 | A1 * | 11/2006 | Matsuo | H04L 49/901 |
| | | | | 709/229 |
| 2010/0169278 | A1 * | 7/2010 | Takada | H04L 12/40143 |
| | | | | 707/E17.005 |
| 2010/0329272 | A1 * | 12/2010 | Tsuboi | H04L 12/66 |
| | | | | 370/401 |

(Continued)

FOREIGN PATENT DOCUMENTS

WO    WO-2020048353 A1 *    3/2020    ......... B60R 11/0217

*Primary Examiner* — Shean Tokuta
(74) *Attorney, Agent, or Firm* — Greenberg Traurig

(57) ABSTRACT

A system that has a plurality of controllers of a vehicle configured to execute functions of the vehicle as well as a gateway of the vehicle configured to secure communications between the plurality of controllers and resources of the controllers. To secure the communication, the gateway can be configured to generate links between the controllers and host devices having the resources according to a stored group of approved devices as well as establish, via the links, secured channels for communication between the controllers and the host devices. The system can also include a caching buffer, configured to hold data to be stored to and retrieved from data storage nodes of a distributed data storage system of the vehicle. The distributed data storage system can be configured to store data used by operations performed by the controllers and the gateway.

19 Claims, 5 Drawing Sheets

(56) References Cited

U.S. PATENT DOCUMENTS

| | | | |
|---|---|---|---|
| 2011/0191392 A1* | 8/2011 | Kameda | G07C 5/008 707/812 |
| 2012/0327939 A1* | 12/2012 | Jang | H04L 12/66 370/392 |
| 2015/0081345 A1* | 3/2015 | Wallach | G06Q 40/08 705/4 |
| 2015/0269790 A1* | 9/2015 | Batcheller | G07C 5/085 701/537 |
| 2015/0372975 A1* | 12/2015 | Moriya | H04L 63/0281 726/11 |
| 2016/0026543 A1* | 1/2016 | Tian | G06F 11/1076 714/4.11 |
| 2016/0125425 A1* | 5/2016 | Avary | G06Q 30/0185 705/318 |
| 2017/0041373 A1* | 2/2017 | Tai | G06Q 10/10 |
| 2017/0072876 A1* | 3/2017 | Rajan | H04L 45/52 |
| 2017/0098374 A1* | 4/2017 | Sullivan | G08G 1/0129 |
| 2017/0295094 A1* | 10/2017 | Jackson | H04L 67/01 |
| 2018/0126930 A1* | 5/2018 | Ando | H04L 47/24 |
| 2018/0281598 A1* | 10/2018 | Shu | G05B 19/042 |
| 2018/0338003 A1* | 11/2018 | Carlson | H04W 4/70 |
| 2019/0104108 A1* | 4/2019 | Rhee | H04L 63/1425 |
| 2019/0108014 A1* | 4/2019 | Nakamura | B60R 16/02 |
| 2019/0130736 A1* | 5/2019 | Silver | G08G 1/0145 |
| 2019/0190893 A1* | 6/2019 | Troia | H04L 63/0428 |
| 2019/0302759 A1* | 10/2019 | Golsch | H04W 4/80 |
| 2019/0304210 A1* | 10/2019 | Jordan | G06F 13/14 |
| 2019/0332998 A1* | 10/2019 | Ruxton | G08G 5/0086 |
| 2020/0059383 A1* | 2/2020 | Kawauchi | H04L 67/12 |
| 2020/0074771 A1* | 3/2020 | Yang | B60Q 1/52 |
| 2020/0145492 A1* | 5/2020 | Slik | H04L 67/563 |
| 2020/0245234 A1* | 7/2020 | Omiya | H04L 12/40 |
| 2020/0254971 A1* | 8/2020 | Golsch | B60R 25/20 |
| 2020/0274851 A1* | 8/2020 | Qiao | H04L 63/0263 |
| 2020/0298800 A1* | 9/2020 | Golsch | H04W 4/021 |
| 2020/0304337 A1* | 9/2020 | Walrant | H04L 12/40104 |
| 2020/0307614 A1* | 10/2020 | Jordan | B61L 27/57 |
| 2020/0326981 A1* | 10/2020 | Pfister | G06F 9/505 |
| 2020/0334254 A1* | 10/2020 | Arye | G06F 16/2393 |
| 2020/0344090 A1* | 10/2020 | Park | H04L 12/66 |
| 2020/0363223 A1* | 11/2020 | Abrams | G06F 30/20 |
| 2020/0364726 A1* | 11/2020 | Avary | G06Q 30/018 |
| 2020/0382403 A1* | 12/2020 | Borisov | G06F 11/3414 |
| 2021/0385294 A1* | 12/2021 | Bielby | H04L 67/12 |

* cited by examiner

GATEWAY FOR VEHICLE WITH CACHING BUFFER FOR DISTRIBUTED STORAGE SYSTEM

FIELD OF THE TECHNOLOGY

At least some embodiments disclosed herein relate to a gateway in a vehicle with a caching buffer for a distributed storage system.

BACKGROUND

In general, a gateway can be considered a device to provide a secure communication between an app in general and a remote resource that is accessible via a network. A gateway can also be considered a device that allows data to flow from one separate network to another. A gateway can secure a data flow and thwart a third party from listening in on the communication or data flow.

A buffer allows for transfer of data from data storage to a device requesting data from the data storage. An example benefit of a buffer is that it can facilitate the transfer of data when data storage runs at a different speed from the device requesting data from the data storage. A buffer in general is usually considered a mechanism that can store data for a single use and then the data is discarded after the single use. A caching buffer or a buffer with caching-like features on the other hand is a buffer that can store data that can be reused multiple times before the data is discarded from the buffer.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
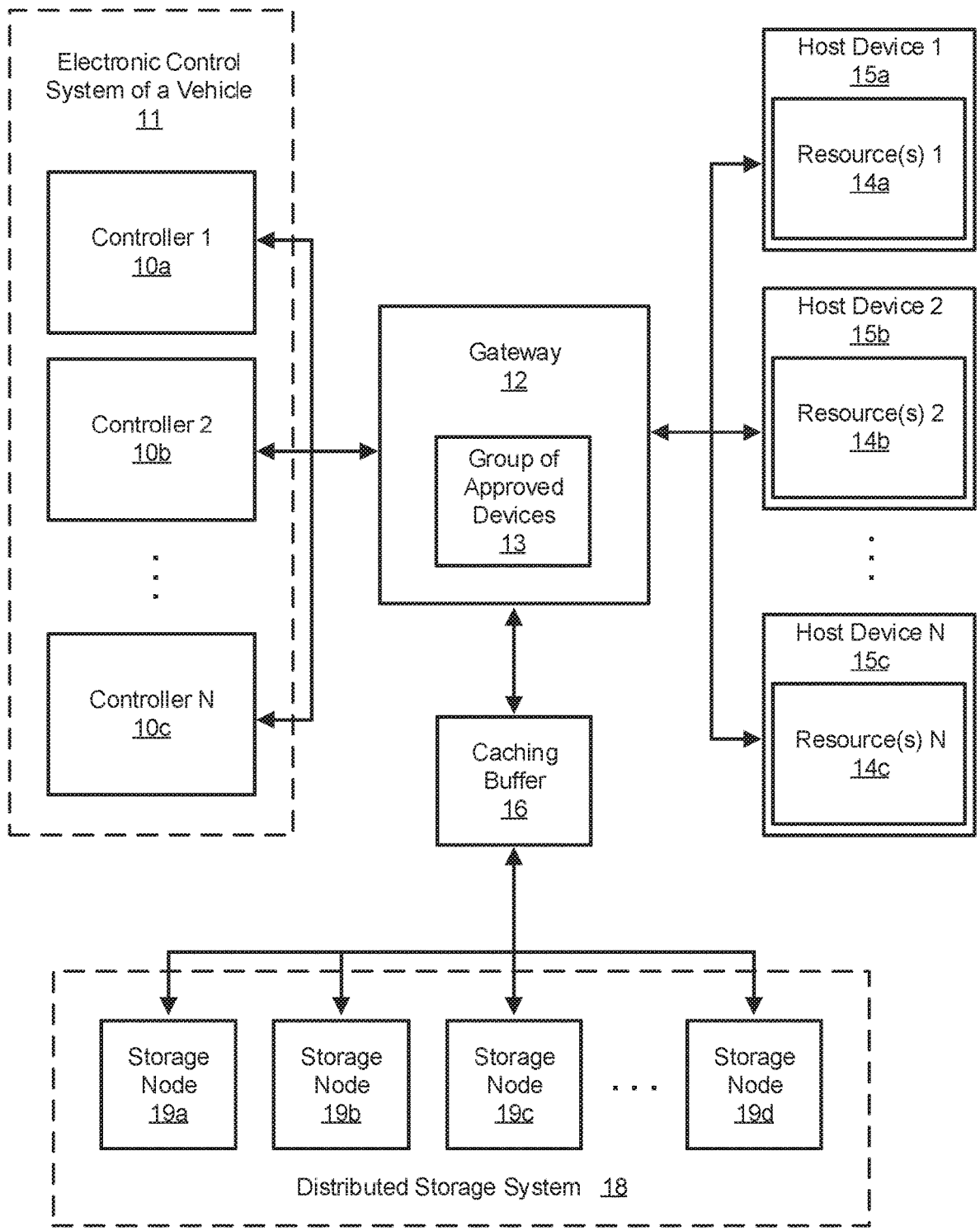
FIG. 1 illustrates an example gateway that can be a part of a vehicle that can be implemented with a caching buffer for distributed storage, in accordance with some embodiments of the present disclosure.

At least some embodiments disclosed herein relate to a gateway in a vehicle with a caching buffer for a distributed storage system. At least some embodiments can include a system that has a plurality of controllers of a vehicle configured to execute functions of the vehicle electronically as well as a gateway of the vehicle configured to secure communications between the plurality of controllers and resources of the controllers. To secure the communication, the gateway can be configured to generate links between the controllers and host devices having the resources according to a stored group of approved devices as well as establish, via the links, secured channels for communication between the controllers and the host devices. The system can also include a caching buffer, configured to hold data to be stored to and retrieved from data storage nodes of a distributed data storage system of the vehicle. The distributed data storage system can be configured to store data used by operations performed by the controllers and the gateway.

In some embodiments, the caching buffer is a part of the gateway. And, in some embodiments, the system can include the distributed data storage system. The system can also include a plurality of ports of the vehicle, wherein each port is configured to receive an auxiliary storage device from a user in the vehicle and connect the auxiliary storage device to the distributed data storage system such that the auxiliary storage device becomes one of the data storage nodes of the distributed data storage system.

In some embodiments, an apparatus in a vehicle can provide secure communications between an application running on a computing device of the vehicle or a mobile device within the vehicle and respective backend resources in the vehicle and/or in a computer network external to the vehicle. The gateway can establish, via a link, secure connectivity to one or more hosts of the backend resources such as via a cryptographic protocol (such as SSL/TLS). The secure connectivity is a secured channel used for communication between the app and the hosts. The hosts including the respective backend resources. The secure connection can prevent third parties from listening in or maliciously using the data communicated between the device in the vehicle and the external host device.

The apparatus can also include a caching buffer for separate nodes of data storage. The caching buffer temporarily stores data to be stored in the nodes and data to be read from the nodes, so that data to and from the nodes is more quickly stored to and retrieved from the apparatus and its gateway in its providing of secure communications of the app and respective backend resources. The caching buffer is a buffer that can store data that can be reused multiple times by the gateway or the apparatus before the data is discarded from the buffer.

The caching buffer can be for distributed storage or a distributed data store that can be or include a network of data storage nodes within the vehicle and/or a computer network external to the vehicle where information is stored on external nodes. The data storage of the distributed data store can be done in a replicated fashion. The nodes of the network of nodes can include a number of peer network nodes.

FIG. 1 illustrates an example gateway 12 that can be a part of a vehicle that can be implemented with a caching buffer for distributed storage (e.g., see caching buffer 16), in accordance with some embodiments of the present disclosure.

In FIG. 1, depicted is a system that includes a plurality of controllers (e.g., see controllers 10a, 10b, and 10c) of a vehicle configured to execute functions of the vehicle electronically. The plurality of controllers can be a part of an electronic control system of the vehicle. The system also includes a gateway 12 (which can be a gateway of the vehicle) configured to secure communications between the plurality of controllers and resources of the controllers (e.g., see one or more resources 14a, 14b, and 14c).

To secure the communication, the gateway 12 can be configured to generate links between the controllers and host devices having the resources (e.g., see host devices 15a, 15b, and 15c). The gateway 12 can be configured to generate links between the controllers and host devices according to a stored group of approved devices 13. Also, to secure the communication, the gateway 12 can be configured to establish, via the links, secured channels for communication between the controllers and the host devices.

The system shown in FIG. 1 also includes a caching buffer 16, configured to hold data to be stored to and retrieved from data storage nodes (e.g., see storage nodes 19a, 19b, 19c, and 19d) of a distributed data storage system 18. The distributed data storage system 18 can be a part of the vehicle. Also, the distributed data storage system 18 can be configured to store data used by operations performed by the controllers and/or the gateway.

As shown in FIG. 1, the gateway 12 can be communicatively coupled to the caching buffer 16. Alternatively, the caching buffer 16 can be a part of the gateway 12.

The depicted system also includes the distributed data storage system 18, which can be a part of the vehicle. Not depicted, the system can include a plurality of ports of the vehicle, and each port of the plurality of ports can be configured to receive an auxiliary storage device from a user in the vehicle and connect the auxiliary storage device to the distributed data storage system 18 such that the auxiliary storage device becomes one of the data storage nodes of the distributed data storage system (e.g., see storage nodes 19a to 19d).

In some embodiments, the data storage nodes of the distributed data storage system 18 (e.g., see storage nodes 19a to 19d) are nodes of a private computer network of the vehicle. And, the private computer network can be secured via the gateway 12 in that access to the nodes of the private computer network only occurs via establishment of secured channels by the gateway. In such embodiments and others, the data storage nodes of the distributed data storage system 18 can include a plurality of peer network nodes. The storage nodes 19a to 19d can be peer network nodes for example. In such examples and others, the storage of data amongst the plurality of peer network nodes can include a data replication process such that there are copies of data at each one of the peer network nodes. In some embodiments, at least some of the data storage nodes (e.g., see storage nodes 19a to 19d) of the distributed data storage 18 are nodes of a private computer network external to the vehicle, and the private computer network can be secured via the gateway 12 in that access to the nodes of the private computer network occurs via establishment of secured channels by the gateway. For example, the private computer network can be secured via the gateway 12 in that access to the nodes of the private computer network external to the vehicle only occurs via establishment of secured channels by the gateway.

In some embodiments, at least some of the resources (e.g., see one or more resources 14a, 14b, and 14c) of the controllers (e.g., see controllers 10a to 10b) are in nodes of a private computer network of the vehicle, and the private computer network can be secured via the gateway 12 in that access to the nodes of the private computer network occurs (or only occurs) via establishment of secured channels by the gateway. Also, in some embodiments, at least some of the resources (e.g., see one or more resources 14a, 14b, and 14c) of the controllers (e.g., see controllers 10a to 10b) are in nodes of a private computer network external to the vehicle, and the private computer network external to the vehicle can be secured via the gateway 12 in that access to the nodes of the private computer network occurs (such as only occurs) via establishment of secured channels by the gateway.

In some embodiments, the gateway 12 can be configured to establish the secured channels via the links and a cryptographic protocol. The cryptographic protocol can include a secure sockets layer (SSL). Also, the cryptographic protocol can include a transport layer security (TLS).

The system in FIG. 1 can implement a method including securing, by the gateway 12, communication between a plurality of controllers of a vehicle (e.g., see controllers 10a to 10b) and resources of the controllers (e.g., see resources(s) 14a, 14b, and 14c). The securing of the communication can include generating links between the controllers and host devices including the resources (e.g., see host devices 15a to 15c) according to a stored group of approved devices 13. The securing of the communication can also include establishing, via the links, secured channels for communication between the controllers and the host devices. The method can also include executing, by the controllers, functions of the vehicle electronically based at least in part on the secured communication between the controllers and the resources of the controllers. The method can also include holding, by the caching buffer 16, data to be stored to data storage nodes of the distributed data storage system 18, which can be a distributed data system of the vehicle. The method can also include storing, by the distributed data storage system, data used by operations performed by the controllers and the gateway as well as holding, by the caching buffer 16, data to be retrieved from the data storage nodes by the operations performed by the controllers and the gateway. The method can also include retrieving, by the operations, the stored data to perform the operations with the stored data. The operations can include the securing of communication between the controllers and the resources by the gateway 12 and the executing of the functions of the vehicle by the controllers.

In some embodiments, the method implemented by the system in FIG. 1 can include receiving, by a port of the vehicle, an auxiliary storage device from a user in the vehicle and connecting, by the port, the auxiliary storage device to the distributed data storage system 18 such that the auxiliary storage device becomes one of the data storage nodes of the distributed data storage system (e.g., see storage nodes 19a to 19d). In such examples and other embodiments, the data storage nodes of the distributed data storage system 18 are nodes of a private computer network of the vehicle and/or nodes of a private computer network external to the vehicle, and each of the private computer networks can be secured via the gateway 12 in that access to the nodes of the private computer networks occurs or only occurs via establishment of secured channels by the gateway. The data storage nodes of the distributed data storage system can include a plurality of peer network nodes, and the storage of data amongst the plurality of peer network nodes can include a data replication process.

In some embodiments, at least some of the resources of the controllers are in nodes of a first private computer network of the vehicle, and at least some of the resources of the controllers are in nodes of a second private computer network external to the vehicle. And, in such examples, the first and second private computer networks can be secured via the gateway in that access to the nodes of the first and second private computer networks occur or only occur via establishment of secured channels by the gateway. In such embodiments and others, establishment of secured channels by the gateway can include establishing the secured channels via the links and a cryptographic protocol. And, the cryptographic protocol can include a secure sockets layer (SSL).

As shown, the system of FIG. 1 can include an apparatus having the secure 12 gateway and the caching buffer 16. And, such an apparatus can be installed in a vehicle that includes the electronic control system 11 and the distributed storage system 18. The host devices 15a to 15c can be a part of the vehicle and/or can be external to the vehicle.

Figure 2:
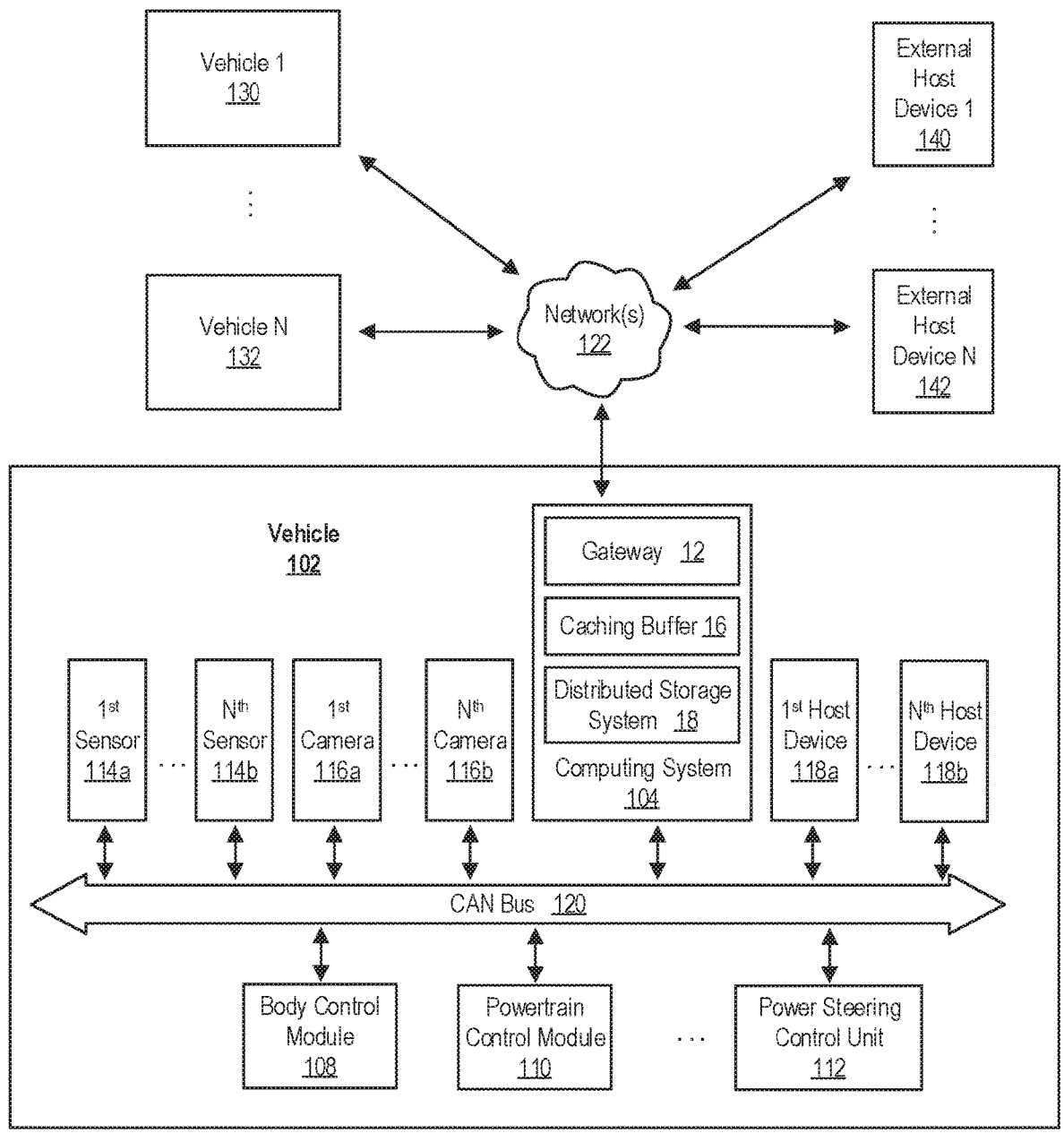
FIGS. 2 to 4 illustrate an example networked system that includes vehicles having gateways such as the example gateway depicted in FIG. 1, in accordance with some embodiments of the present disclosure.
Figure 3:
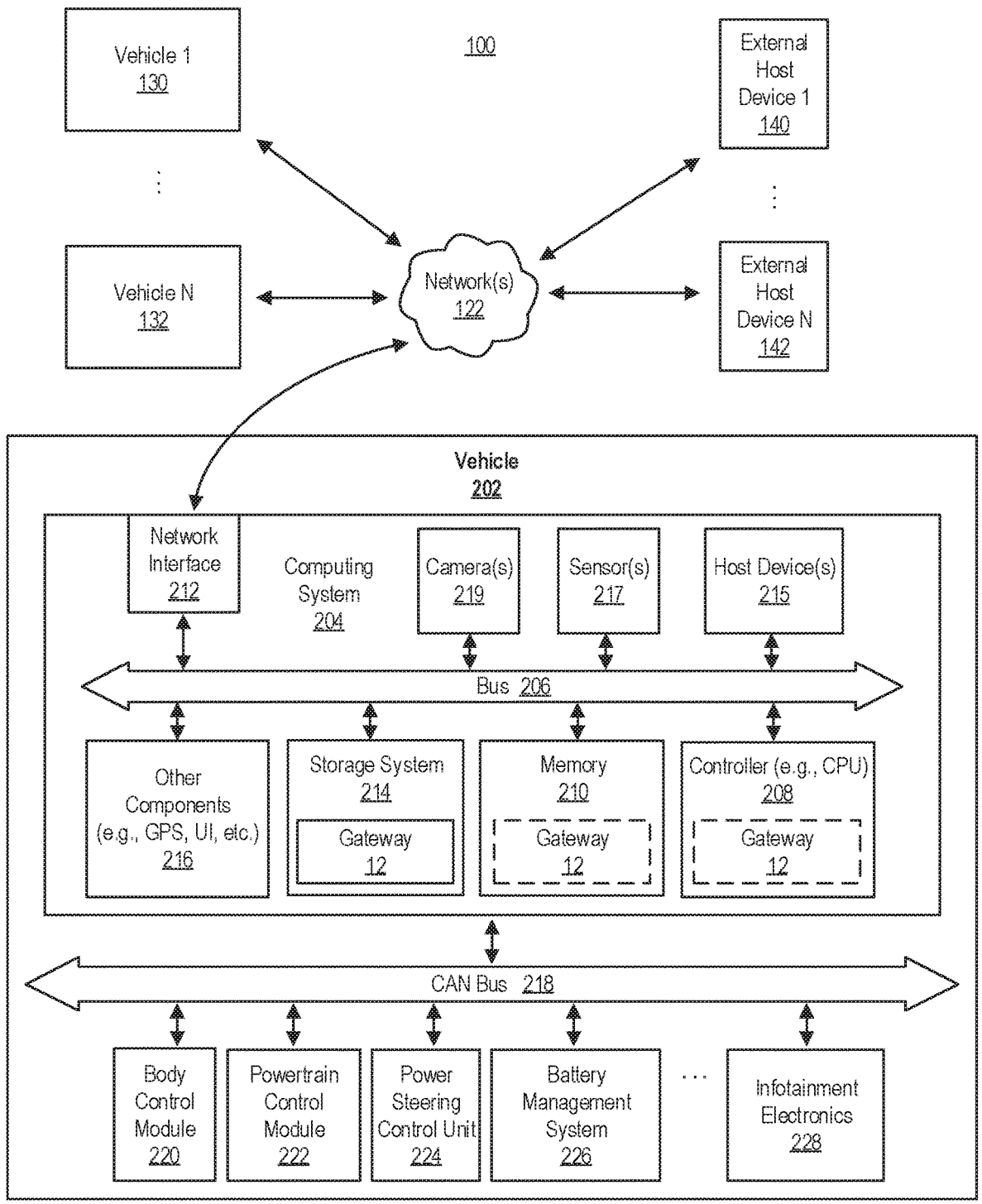
Figure 4:
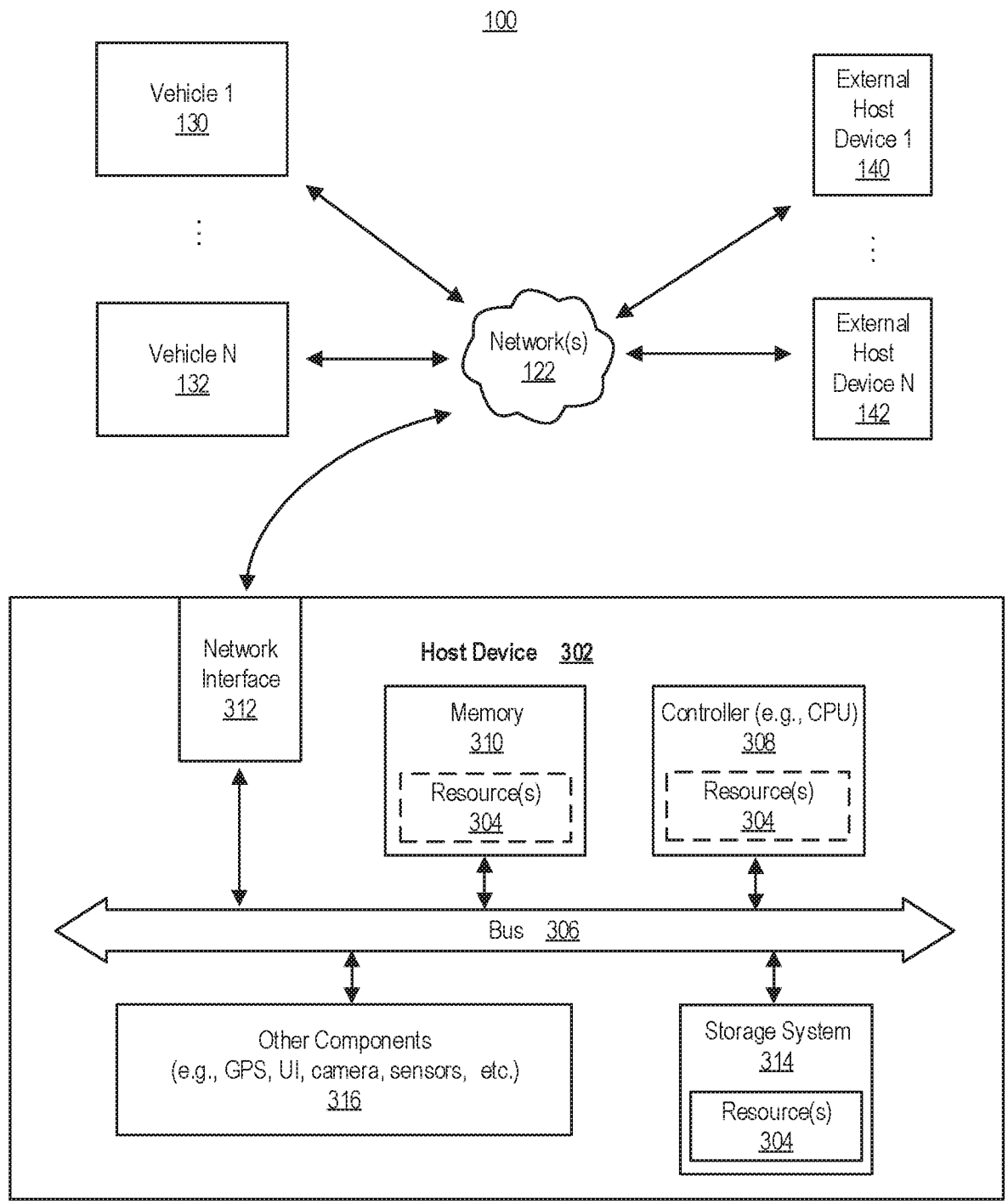

FIGS. 2 to 4 illustrate an example networked system 100 that includes vehicles (e.g., see vehicles 102, 202, and 130 to 132) having gateways such as the example gateway 12 depicted in FIG. 1, in accordance with some embodiments of the present disclosure. Any vehicle of the vehicles 102, 202, and 130 to 132 can be a vehicle that includes parts of the system depicted in FIG. 1. For example, any one or more of the vehicles 102, 202, and 130 to 132 can be a vehicle that includes the electronic control system 11, the controllers 10a to 10c, the gateway 12, the caching buffer 16, the distributed storage system 18, and/or at least some of the storage nodes of the distributed storage system.

The networked system 100 is networked via one or more communications networks 122. Communication networks described herein, such as communications network(s) 122, can include at least a local to device network such as Bluetooth or the like, a wide area network (WAN), a local area network (LAN), the Intranet, a mobile wireless network such as 4G or 5G, an extranet, the Internet, and/or any combination thereof. Nodes of the networked system 100 (e.g., see external host devices 140, 142, and 302 and vehicles 102, 130, 132, and 202) can each be a part of a peer-to-peer network, a client-server network, a cloud computing environment, or the like. Also, any of the apparatuses, computing devices, vehicles, sensors or cameras, and/or user interfaces described herein can include a computer system of some sort (e.g., see vehicle computing systems 104 and 204). And, such a computer system can include a network interface to other devices in a LAN, an intranet, an extranet, and/or the Internet. The computer system can also operate in the capacity of a server or a client machine in client-server network environment, as a peer machine in a peer-to-peer (or distributed) network environment, or as a server or a client machine in a cloud computing infrastructure or environment.

As shown in FIG. 2, the networked system 100 can include at least a vehicle 102 that includes a vehicle computing system 104 (including at least the gateway 12, the caching buffer 16, and the distributed storage system 18 also shown in FIG. 1), a body and controllable parts of the body (not depicted), a powertrain and controllable parts of the powertrain (not depicted), a body control module 108 (which is a type of electronic control unit or ECU—which can include or be a part of one of the controllers shown in FIG. 1), a powertrain control module 110 (which is a type of ECU—which can include or be a part of one of the controllers shown in FIG. 1), and a power steering control unit 112 (which is a type of ECU—which can include or be a part of one of the controllers shown in FIG. 1). The vehicle 102 also includes a plurality of sensors (e.g., see sensors 114a to 114b—which can include sensors), a plurality of cameras (e.g., see cameras 116a to 116b), a plurality of host devices (e.g., see host devices 118a to 118b—which can include or be a part of the plurality of host devices shown in FIG. 1) and a controller area network (CAN) bus 120 that connects at least the vehicle computing system 104, the body control module 108, the powertrain control module 110, the power steering control unit 112, the plurality of sensors, the plurality of cameras, and the plurality of host devices to each other.

Also, as shown, the vehicle 102 is connected to the network(s) 122 via the vehicle computing system 104. Also, shown, vehicles 130 to 132 and external host devices 140 to 142 are connected to the network(s) 122. And, thus, are communicatively coupled to the vehicle 102. The external host devices 140 to 142 can be a part of or include the plurality of host devices shown in FIG. 1. An external host device (such as one of the external host devices 140 to 142) is a device that hosts resources for an application or a controller of a vehicle that is external to the vehicle. The vehicle can connect to an external host device via one or more networks such as network(s) 122.

The aspect of the computing system 104, the sensors 114a to 114b, the cameras 116a to 116b, the host devices 118a to 118b, the body control module 108, the powertrain control module 110, and the power steering control unit 112 can communicate with the external host devices (e.g., devices 140 to 142) and/or other vehicles (e.g., vehicles 130 to 132) via the gateway 12. For such communications, the gateway 12 can be configured to secure communications between such parts of the vehicle 102 and resources of such parts that are being hosted by the external host devices 140 to 142 and/or vehicles 130 to 132. To secure the communication, the gateway can be configured to generate links between the such parts of the vehicle 102 and host devices 140 to 142 and/or vehicles 130 to 132 having the resources according to a stored group of approved devices. The gateway 12 can also be configured to establish, via the links, secured channels for communication between such parts of vehicle 102 and host devices 140 to 142 and/or vehicles 130 to 132.

The caching buffer 16 of computing system 104 can be configured to hold data to be stored to and retrieved from data storage nodes of a distributed data storage system of the vehicle 102 (e.g., see distributed storage system 18 which is shown as a part of computing system 104). For the embodiments shown in FIG. 2, the distributed data storage system 18 can be configured to store data used by operations performed by the aforementioned parts of the vehicle 102 and the gateway 12 of vehicle 102.

A set of mechanical components for controlling the driving of the vehicle 102 can be combined with any one of the electronic controllers depicted in FIGS. 1 to 3 and can include: (1) a brake mechanism on wheels of the vehicle (for stopping the spinning of the wheels), (2) a throttle mechanism on an engine or motor of the vehicle (for regulation of how much gas goes into the engine, or how much electrical current goes into the motor), which determines how fast a driving shaft can spin and thus how fast the vehicle can run, and (3) a steering mechanism for the direction of front wheels of the vehicle (for example, so the vehicle goes in the direction of where the wheels are pointing to). These mechanisms can control the braking (or deacceleration), acceleration (or throttling), and steering of a vehicle. The driver can indirectly control these mechanisms by UI elements (e.g., see other components 216 of vehicle 202 shown in FIG. 3) that can be operated upon by the user, which are typically the brake pedal, the acceleration pedal, and the steering wheel. The pedals and the steering wheel are not necessarily mechanically connected to the driving mechanisms for braking, acceleration and steering. Such parts can have or be proximate to sensors that measure how much the driver has pressed on the pedals and/or turned the steering wheel. The sensed control input is transmitted to the control units over wires (and thus can be drive-by-wire). Such control units can include any one of the controllers shown in FIG. 1 (e.g., see controllers 10a to 10c), body control module 108 or 220, powertrain control module 110 or 222, power steering control unit 112 or 224, battery management system 226, etc. Such output can also be sensed and/or recorded by the sensors and cameras described herein as well (e.g., see sensors 114a to 114b or 217 and cameras 116a to 116b or 219). And, the output of the sensors and cameras can be further processed then reported to server(s) (e.g., see external host devices 140 to 142, which can include one or more servers) for cumulative data processing of contextual data related to the driver of the vehicle and other drivers. Such output can be communicated via a secured channel established by the gateway 12.

In a vehicle, such as vehicle 102 or 202, a driver can control the vehicle via physical control elements (e.g., steering wheel, brake pedal, gas pedal, paddle gear shifter, etc.) that interface drive components via mechanical linkages and some electromechanical linkages. However, more and more vehicles currently have the control elements interface the mechanical powertrain elements (e.g., brake system, steering mechanisms, drive train, etc.) via electronic control elements or modules (e.g., electronic control units or ECUs). The electronic control elements or modules can be a part of drive-by-wire technology. Drive-by-wire technology can include electrical or electromechanical systems for performing vehicle functions traditionally achieved by mechanical linkages. The technology can replace the traditional mechanical control systems with electronic control systems using electromechanical actuators and human-machine interfaces such as pedal and steering feel emulators. Components such as the steering column, intermediate shafts, pumps, hoses, belts, coolers and vacuum servos and master cylinders can be eliminated from the vehicle. There are varying degrees and types of drive-by-wire technology. Vehicles, such as vehicles 102 and 202, having drive-by-wire technology can include a modulator (such as a modulator including or being a part of an ECU and/or an advance driver assistance system or ADAS) that receives input from a user or driver (such as via more conventional controls or via drive-by-wire controls or some combination thereof). The modulator can then use the input of the driver to modulate the input or transform it to match input of a "safe driver". When such components output communications to devices remote of the vehicle 102 or 202, such communications can be communicated via a secured channel established by the gateway 12.

In some embodiments, the electronic circuitry of a vehicle (e.g., see vehicles 102 and 202), which can include or be a part of the computing system of the vehicle, can include at least one of engine electronics, transmission electronics, chassis electronics, driver or passenger environment and comfort electronics, in-vehicle entertainment electronics, in-vehicle safety electronics, or navigation system electronics, or any combination thereof (e.g., see body control modules 108 and 220, powertrain control modules 110 and 222, power steering control units 112 and 224, battery management system 226, and infotainment electronics 228 shown in FIGS. 2 and 3 respectively). In some embodiments, the electronic circuitry of the vehicle can include electronics for an automated driving system. When such components output communications to devices remote of the vehicle 102 or 202, such communications can be communicated via a secured channel established by the gateway 12.

As shown in FIG. 3, the networked system 100 can include at least vehicles 130 to 132 and vehicle 202 which includes at least a vehicle computing system 204, a body (not depicted) having an interior (not depicted), a powertrain (not depicted), a climate control system (not depicted), and an infotainment system (not depicted). The vehicle 202 can include other vehicle parts as well.

The vehicle computing system 204, which can have similar structure and/or functionality as the vehicle computing system 104, can be connected to communications network(s) 122 that can include at least a local to device network such as Bluetooth or the like, a wide area network (WAN), a local area network (LAN), an intranet, a mobile wireless network such as 4G or 5G, an extranet, the Internet, and/or any combination thereof. The vehicle computing system 204 can be a machine capable of executing a set of instructions (sequential or otherwise) that specify actions to be taken by that machine. Also, while a single machine is illustrated for the vehicle computing system 204, the term "machine" shall also be taken to include any collection of machines that individually or jointly execute a set (or multiple sets) of instructions to perform a methodology or operation. And, it can include at least a bus (e.g., see bus 206) and/or motherboard, one or more controllers (such as one or more CPUs, e.g., see controller 208), a main memory (e.g., see memory 210) that can include temporary data storage, at least one type of network interface (e.g., see network interface 212), a storage system (e.g., see data storage system 214) that can include permanent data storage, and/or any combination thereof. In some multi-device embodiments, one device can complete some parts of the methods described herein, then send the result of completion over a network to another device such that another device can continue with other steps of the methods described herein.

FIG. 3 also illustrates example parts of the vehicle computing system 204 that can include and implement at least software aspects of the gateway 12. The vehicle computing system 204 can be communicatively coupled to the network(s) 122 as shown. The vehicle computing system 204 includes at least a bus 206, a controller 208 (such as a CPU) that can execute instructions of the gateway 12, memory 210 that can hold the instructions of the gateway 12 for execution, a network interface 212, a data storage system 214 that can store instructions for the gateway 12, and other components 216—which can be any type of components found in mobile or computing devices such as GPS components, I/O components such as a camera and various types of user interface components (which can include one or more of the plurality of UI elements described herein) and sensors (which can include one or more of the plurality of sensors described herein). The other components 216 can include one or more user interfaces (e.g., GUIs, auditory user interfaces, tactile user interfaces, car controls, etc.), displays, different types of sensors, tactile, audio and/or visual input/output devices, additional application-specific memory, one or more additional controllers (e.g., GPU), or any combination thereof.

The vehicle computing system 204 can also include sensor and camera interfaces that are configured to interface sensors and cameras of the vehicle 202 which can be one or more of any of the sensors or cameras described herein (e.g., see sensor(s) 217 and camera(s) 219). The vehicle computing system 204 can also include host devices similar to the host devices depicted as part of vehicle 102 in FIG. 2 (e.g., see host device(s) 215). The bus 206 communicatively couples the controller 208, the memory 210, the network interface 212, the data storage system 214, the other components 216, the host device(s) 215 and the sensors and cameras as well as sensor and camera interfaces in some embodiments.

The vehicle computing system 204 includes a computer system that includes at least controller 208, memory 210 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 214, which communicate with each other via bus 206 (which can include multiple buses).

In some embodiments, the vehicle computing system 204 can include a set of instructions, for causing a machine to perform any one or more of the methodologies discussed herein, when executed. In such embodiments, the machine can be connected (e.g., networked via network interface 212) to other machines in a LAN, an intranet, an extranet, and/or the Internet (e.g., network(s) 122). The machine can operate in the capacity of a server or a client machine in client-server network environment, as a peer machine in a peer-to-peer (or distributed) network environment, or as a server or a client machine in a cloud computing infrastructure or environment.

Controller 208 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 208 can also be one or more special-purpose processing devices such as an ASIC, a programmable logic such as an FPGA, a digital signal processor (DSP), network processor, or the like. Controller 208 is configured to execute instructions for performing the operations and steps discussed herein. Controller 208 can further include a network interface device such as network interface 212 to communicate over one or more communications network (such as network(s) 122).

The data storage system 214 can include a machine-readable storage medium (also known as a computer-readable medium) on which is stored one or more sets of instructions or software embodying any one or more of the methodologies or functions described herein. The data storage system 214 can have execution capabilities such as it can at least partly execute instructions residing in the data storage system. The instructions can also reside, completely or at least partially, within the memory 210 and/or within the controller 208 during execution thereof by the computer system, the memory 210 and the controller 208 also constituting machine-readable storage media. The memory 210 can be or include main memory of the system 204. The memory 210 can have execution capabilities such as it can at least partly execute instructions residing in the memory.

The vehicle 202 can also have vehicle body control module 220 of the body, powertrain control module 222 of the powertrain, a power steering control unit 224, a battery management system 226, infotainment electronics 228 of the infotainment system, and a CAN bus 218 that connects at least the vehicle computing system 204, the vehicle body control module, the powertrain control module, the power steering control unit, the battery management system, and the infotainment electronics. Also, as shown, the vehicle 202 is connected to the network(s) 122 via the vehicle computing system 204. Also, shown, vehicles 130 to 132 and external host devices 140 to 142 are connected to the network(s) 122. And, thus, are communicatively coupled to the vehicle 202.

The vehicle 202 is also shown having the plurality of sensors (e.g., see sensors 217a to 217b) and the plurality of cameras (e.g., see cameras 219a to 219b), which can be part of the vehicle computing system 204. In some embodiments, the CAN bus 218 can connect the plurality of sensors and the plurality of cameras, the vehicle computing system 204, the vehicle body control module, the powertrain control module, the power steering control unit, the battery management system, and the infotainment electronics to at least the vehicle computing system 204. The plurality of sensors and the plurality of cameras can be connected to the vehicle computing system 204 via sensor and camera interfaces of the computing system. In other embodiments, other bus types (e.g., Ethernet, HDBaseT, or EAVB) may be used as an alternative to the CAN bus.

As shown in FIG. 4, the networked system 100 can include a host device 302 (which can be a host device that hosts resources in a vehicle or an external host device outside of a vehicle that hosts resources external to a vehicle). For example, host device 302 can be one of host devices 15a to 15c shown in FIG. 1 as well as one of the host devices shown in FIGS. 2 to 3. The host device 302, similar to other host devices described herein can be connected to other devices via communications network(s) 122 and gateway 12. And, thus, be connected to vehicles 102, 202, and 130 to 132 as well as host devices 140 to 142. The host device 302 (or host device 140 or 142) can include one or more of the plurality of sensors mentioned herein, one or more of the plurality of UI elements mentioned herein, a GPS device, and/or one or more of the plurality of cameras mentioned herein. Thus, the host device 302 (or host device 140 or 142) can act similarly to a computing system. The host device (or host device 140 or 142) can host and run resources, such as the resource(s) 14a to resource(s) 14c shown in FIG. 1 and the resources mentioned in describing the elements depicted in FIGS. 2 and 3.

The host device 302, depending on the embodiment, can be or include a mobile device or another type of computing device, e.g., a smartphone, tablet computer, IoT device, smart television, smart watch, glasses or other smart household appliance, in-vehicle information system, wearable smart device, game console, PC, or digital camera, or any combination thereof. As shown, the host device 302 can be connected to communications network(s) 122 that includes at least a local to device network such as Bluetooth or the like, a wide area network (WAN), a local area network (LAN), an intranet, a mobile wireless network such as 4G or 5G, an extranet, the Internet, and/or any combination thereof.

Some of the host devices described herein can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. The computing systems of the vehicles described herein can be a machine capable of executing a set of instructions (sequential or otherwise) that specify actions to be taken by that machine.

Also, while a single machine is illustrated for the computing systems described herein, the term "machine" shall also be taken to include any collection of machines that individually or jointly execute a set (or multiple sets) of instructions to perform any one or more of the methodologies or operations discussed herein. And, each of the illustrated host devices can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

FIG. 4 also illustrates example parts of the host device 302, in accordance with some embodiments of the present disclosure. The host device 302 can be communicatively coupled to the network(s) 122 as shown. The host device 302 includes at least a bus 306, a controller 308 (such as a CPU), memory 310, a network interface 312, a data storage system 314, and other components 316 (which can be any type of components found in mobile or computing devices such as GPS components, I/O components such various types of user interface components, and sensors (such as sensors) as well as one or more cameras). The other components 316 can include one or more user interfaces (e.g., GUIs, auditory user interfaces, tactile user interfaces, etc.), displays, different types of sensors, tactile (such as sensors), audio and/or visual input/output devices, additional application-specific memory, one or more additional controllers (e.g., GPU), or any combination thereof. The bus 306 communicatively couples the controller 308, the memory 310, the network interface 312, the data storage system 314 and the other components 316. The host device 302 includes a computer system that includes at least controller 308, memory 310 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 314, which communicate with each other via bus 306 (which can include multiple buses).

To put it another way, FIG. 4 is a block diagram of host device 302 that has a computer system in which embodiments of the present disclosure can operate. In some embodiments, the computer system can include a set of instructions, for causing a machine to perform some of the methodologies discussed herein, when executed. In such embodiments, the machine can be connected (e.g., networked via network interface 312) to other machines in a LAN, an intranet, an extranet, and/or the Internet (e.g., network(s) 122). The machine can operate in the capacity of a server or a client machine in client-server network environment, as a peer machine in a peer-to-peer (or distributed) network environment, or as a server or a client machine in a cloud computing infrastructure or environment.

Controller 308 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 308 can also be one or more special-purpose processing devices such as an ASIC, a programmable logic such as an FPGA, a digital signal processor (DSP), network processor, or the like. Controller 308 is configured to execute instructions for performing the operations and steps discussed herein. Controller 308 can further include a network interface device such as network interface 312 to communicate over one or more communications network (such as network(s) 122).

The data storage system 314 can include a machine-readable storage medium (also known as a computer-readable medium) on which is stored one or more sets of instructions or software embodying any one or more of the methodologies or functions described herein. The data storage system 314 can have execution capabilities such as it can at least partly execute instructions residing in the data storage system. The instructions can also reside, completely or at least partially, within the memory 310 and/or within the controller 308 during execution thereof by the computer system, the memory 310 and the controller 308 also constituting machine-readable storage media. The memory 310 can be or include main memory of the device 302. The memory 310 can have execution capabilities such as it can at least partly execute instructions residing in the memory.

While the memory, controller, and data storage parts are shown in example embodiments to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As shown in FIG. 4, the host device 302 can include a user interface (e.g., see other components 316). The user interface can be configured to provide a graphical user interface (GUI), a tactile user interface, or an auditory user interface, or any combination thereof. For example, the user interface can be or include a display connected to at least one of a wearable structure, a computing device, or a camera or any combination thereof that can also be a part of the host device 302, and the display can be configured to provide a GUI. Also, embodiments described herein can include one or more user interfaces of any type, including tactile UI (touch), visual UI (sight), auditory UI (sound), olfactory UI (smell), equilibria UI (balance), and gustatory UI (taste).

Figure 5:
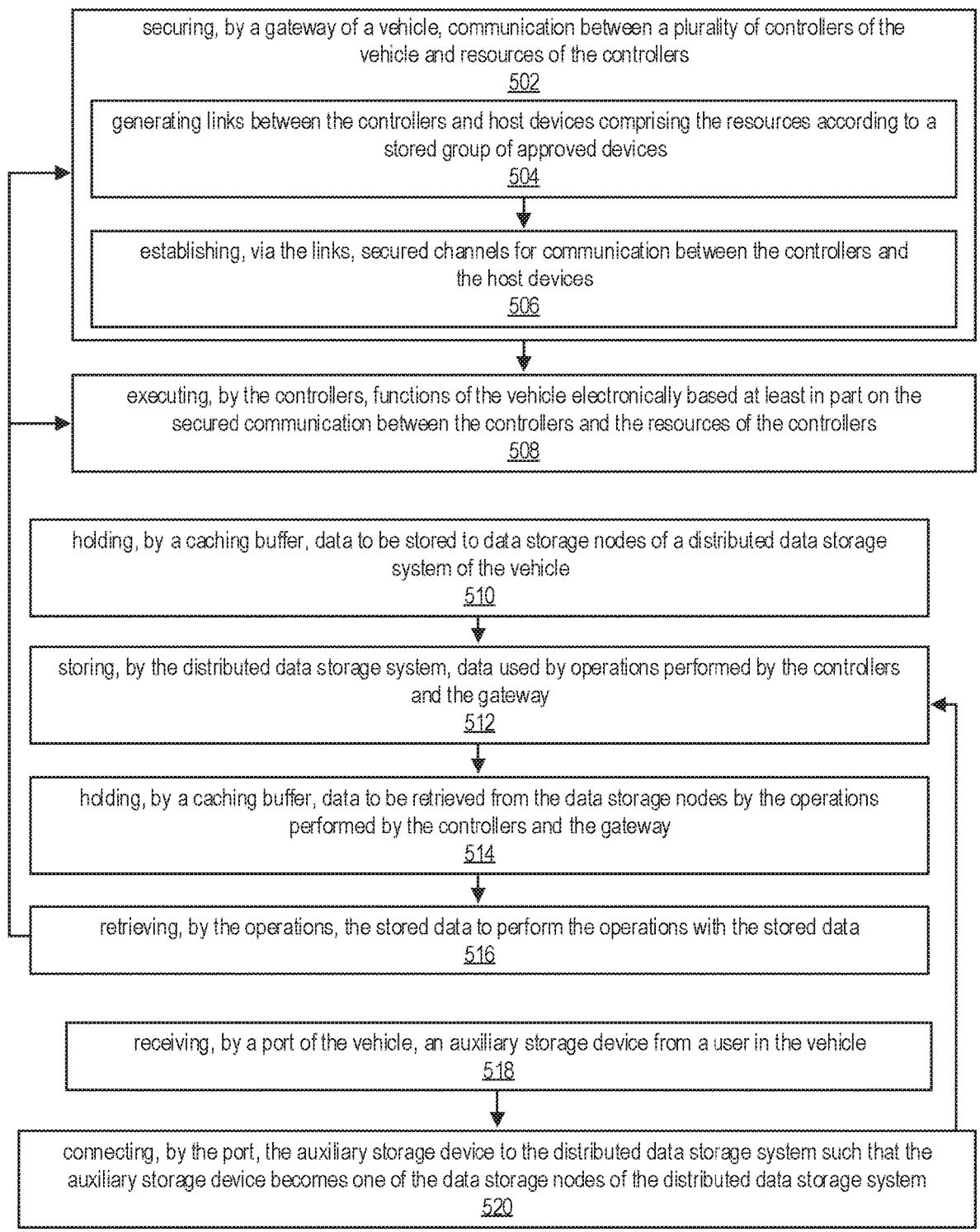
FIG. 5 illustrates a flow diagram of example operations that can be performed by aspects of a gateway or parts of a vehicle, such as aspects and parts shown in FIGS. 1 to 4, in accordance with some embodiments of the present disclosure.

FIG. 5 illustrates a flow diagram of example operations of method 500 that can be performed by aspects of the system shown in FIG. 1 as well as some aspects of the networked system 100 depicted in FIGS. 2 to 4, in accordance with some embodiments of the present disclosure. For example, the method 500 can be performed by a gateway (such as gateway 12), controllers of a vehicle system (such as controllers 10a to 10c) and/or other parts of a vehicle and/or host device depicted in FIGS. 1 to 4.

In FIG. 5, the method 500 begins at step 502 with securing, by a gateway of a vehicle, communication between a plurality of controllers of the vehicle and resources of the controllers. At step 504, which is a part of step 502, the method 500 continues with generating, such as by the gateway, links between the controllers and host devices including the resources according to a stored group of approved devices. At step 506, which is a part of step 502, the method 500 continues with establishing, such as by the gateway, via the links, secured channels for communication between the controllers and the host devices.

At step 508, the method 500 continues with executing, by the controllers, functions of the vehicle electronically based at least in part on the secured communication between the controllers and the resources of the controllers.

At step 510, the method 500 continues with holding, by a caching buffer, data to be stored to data storage nodes of a distributed data storage system of the vehicle. At step 512, the method 500 continues with storing, by the distributed data storage system, data used by operations performed by the controllers and the gateway. At step 514, the method 500 continues with holding, by a caching buffer, data to be retrieved from the data storage nodes by the operations performed by the controllers and the gateway. At step 516, the method 500 continues with retrieving, by the operations, the stored data to perform the operations with the stored data.

At step 518, the method 500 continues with receiving, by a port of the vehicle, an auxiliary storage device from a user in the vehicle. At step 520, the method 500 continues with connecting, by the port, the auxiliary storage device to the distributed data storage system such that the auxiliary storage device becomes one of the data storage nodes of the distributed data storage system.

In some embodiments, it is to be understood that the steps of method 500 can be implemented as a continuous process such as each step can run independently by monitoring input data, performing operations and outputting data to the subsequent step. Also, such steps for each method can be implemented as discrete-event processes such as each step can be triggered on the events it is supposed to trigger and produce a certain output. It is to be also understood that FIG. 5 represents a minimal method within a possibly larger method of a computer system more complex than the ones presented partly in FIGS. 1 to 4. Thus, the steps depicted in FIG. 5 can be combined with other steps feeding in from and out to other steps associated with a larger method of a more complex system.

It is to be understood that a vehicle described herein can be any type of vehicle unless the vehicle is specified otherwise. Vehicles can include cars, trucks, boats, and airplanes, as well as vehicles or vehicular equipment for military, construction, farming, or recreational use. Electronics used by vehicles, vehicle parts, or drivers or passengers of a vehicle can be considered vehicle electronics. Vehicle electronics can include electronics for engine management, ignition, radio, carputers, telematics, in-car entertainment systems, and other parts of a vehicle. Vehicle electronics can be used with or by ignition and engine and transmission control, which can be found in vehicles with internal combustion powered machinery such as gas-powered cars, trucks, motorcycles, boats, planes, military vehicles, forklifts, tractors and excavators. Also, vehicle electronics can be used by or with related elements for control of electrical systems found in hybrid and electric vehicles such as hybrid or electric automobiles. For example, electric vehicles can use power electronics for the main propulsion motor control, as well as managing the battery system. And, autonomous vehicles almost entirely rely on vehicle electronics.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
a gateway, configured to:
generate links between controllers of a vehicle and resources for the controllers, wherein the links between the controllers of the vehicle and the resources are generated according to a stored group of approved devices; and
establish, via the links, channels for communication between the controllers and the resources;
a caching buffer, configured to hold data to be stored to data storage nodes of a distributed data storage system and to be retrieved from the data storage nodes of the distributed data storage system of the vehicle by operations performed by the controllers of the vehicle, wherein a portion of the data storage nodes of the vehicle serve as nodes of a private computer network external to the vehicle, wherein access to the private computer network external to the vehicle is facilitated via the channels established via the links between the controllers of the vehicle and the resources for the controllers, wherein the caching buffer is configured to hold the data to be stored and retrieved for reuse a plurality of times before being discarded from the caching buffer; and a port configured to:
connect an auxiliary storage device connected to the port to the distributed data storage system such that the auxiliary storage device becomes a data storage node of the distributed data storage system while the auxiliary storage device is connected to the port, and wherein the auxiliary storage device is configured to serve as a node of the private computer network external to the vehicle.

2. The system of claim 1, further comprising the distributed data storage system, and wherein the distributed data storage system is configured to store data used by operations performed by the gateway, or the controllers of the vehicle, or a combination thereof.

3. The system of claim 2, wherein the port is configured to: receive the auxiliary storage device.

4. The system of claim 2, wherein the data storage nodes of the distributed data storage system comprise nodes of a private computer network of the vehicle.

5. The system of claim 2, wherein the data storage nodes of the distributed data storage system comprise a plurality of peer network nodes.

6. The system of claim 5, wherein storage of data between the plurality of peer network nodes comprises data replication.

7. The system of claim 2, wherein a remaining portion of the data storage nodes of the distributed data storage system comprise nodes of a private computer network internal to the vehicle.

8. The system of claim 1, wherein the gateway is configured to establish the channels according to a cryptographic protocol.

9. The system of claim 8, wherein the cryptographic protocol comprises a secure sockets layer (SSL).

10. The system of claim 1, wherein the gateway is configured to secure the channels according to the stored group of approved devices.

11. A method, comprising:
generating, by a gateway, links between controllers of a vehicle and resources for the controllers, wherein the links between the controllers of the vehicle and the resources are generated according to a stored group of approved devices;

establishing, via the links, channels for communications between the controllers and the resources according to a cryptographic protocol;

holding, by a caching buffer, data to be stored to data storage nodes of a distributed data storage system of the vehicle, wherein the caching buffer is configured to hold the data to be stored and data to be retrieved from the data storage nodes of the distributed data storage system of the vehicle by operations performed by the controllers of the vehicle for reuse a plurality of times before being discarded from the caching buffer wherein a portion of the data storage nodes of the vehicle serve as nodes of a private computer network external to the vehicle, wherein access to the private computer network external to the vehicle is facilitated via the channels established via the links between the controllers of the vehicle and the resources for the controllers;

connecting an auxiliary storage device connected to a port of the vehicle to the distributed data storage system such that the auxiliary storage device becomes a data storage node of the distributed data storage system while the auxiliary storage device is connected to the port; and executing, by the controllers, functions of the vehicle according to the communications between the controllers and the resources.

12. The method of claim 11, further comprising storing, by the distributed data storage system, data used by operations of the gateway, or the controllers of the vehicle, or a combination thereof.

13. The method of claim 12, further comprising holding, by the caching buffer, data to be retrieved from the data storage nodes for the operations of the gateway, or the controllers of the vehicle, or a combination thereof.

14. The method of claim 13, further comprising retrieving, by the gateway, the data held by the caching buffer.

15. The method of claim 14, further comprising retrieving, by the controllers of the vehicle, the data held by the caching buffer.

16. The method of claim 12, wherein the data storage nodes of the distributed data storage system comprise peer network nodes, and wherein the method comprises replicating data stored in one of the peer network nodes and storing the replicated data to another node of the peer network nodes.

17. The method of claim 12, wherein the data storage nodes of the distributed data storage system comprise nodes of a private computer network external to the vehicle.

18. The method of claim 12, wherein the data storage nodes of the distributed data storage system comprise nodes of a private computer network in the vehicle.

19. An apparatus, comprising:
a computing device, configured to:
generate links between controllers of a vehicle and resources for the controllers, wherein the links between the controllers of the vehicle and the resources are generated according to a stored group of approved devices; and
establish, via the links, secure channels for communication between the controllers and the resources according to a cryptographic protocol;

a caching buffer, configured to hold data to be stored to data storage nodes of a distributed data storage system and to be retrieved from the data storage nodes of the distributed data storage system of the vehicle by operations performed by the controllers of the vehicle, wherein the caching buffer is configured to hold the data to be stored and retrieved for reuse a plurality of times before being discarded from the caching buffer;

wherein a portion of the data storage nodes of the vehicle serve as nodes of a private computer network external to the vehicle, wherein access to the private computer network external to the vehicle is facilitated via the channels established via the links between the controllers of the vehicle and the resources for the controllers, and a port configured to:
connect an auxiliary storage device connected to the port to the distributed data storage system such that the auxiliary storage device becomes a data storage node of the distributed data storage system while the auxiliary storage device is connected to the port.

\* \* \* \* \*